United States Patent [19]

Lehrer

[11] 4,151,865

[45] May 1, 1979

[54] FLEXIBLE TUBE PARTICULARLY FOR DRILLINGS, AND A PROCESS FOR MANUFACTURING SAID TUBE

[76] Inventor: Alfred Lehrer, 10, Marche aux Grains, Haguenau, (Bas-Rhin), France

[21] Appl. No.: 815,544

[22] Filed: Jul. 14, 1977

[30] Foreign Application Priority Data

Aug. 4, 1976 [FR] France .................................. 76 23861

[51] Int. Cl.$^2$ ............................................. F16L 11/18
[52] U.S. Cl. ..................................... 138/120; 138/140
[58] Field of Search .................... 138/120, 118, 118.1, 138/140; 59/78.1; 285/163

[56] References Cited

U.S. PATENT DOCUMENTS

| 428,023 | 5/1890 | Schoff | 138/20 |
|---|---|---|---|
| 907,692 | 12/1908 | Hervey | 285/163 |
| 1,037,575 | 9/1912 | Andersen | 59/78.1 |
| 1,255,577 | 2/1918 | Berry | 285/163 |
| 1,822,624 | 9/1931 | Hoeftmann | 138/120 |
| 2,136,770 | 11/1938 | Witzenmann | 138/120 |
| 2,696,264 | 12/1954 | Colmerauer et al. | 138/120 |

Primary Examiner—Richard E. Aegerter
Assistant Examiner—L. Footland
Attorney, Agent, or Firm—Kinzer, Plyer, Dorn & McEachran

[57] ABSTRACT

(a) A flexible tube particularly for drillings, and a process for manufacturing said tube.

(b) A tube wherein each ring has a male portion and a female portion, the male portion of a ring being designed to fit in the contiguous female portion, said male and female portions each carrying an abutment, a locking means being fitted between the male portion and the female portion of two contiguous rings by co-operating with said abutments of the male and female portions so as to prevent both said rings from parting from one another although providing an axial clearance to said rings.

5 Claims, 5 Drawing Figures

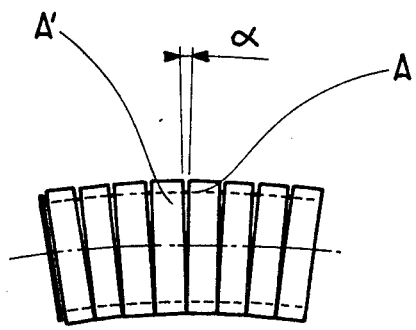
Figure: 1
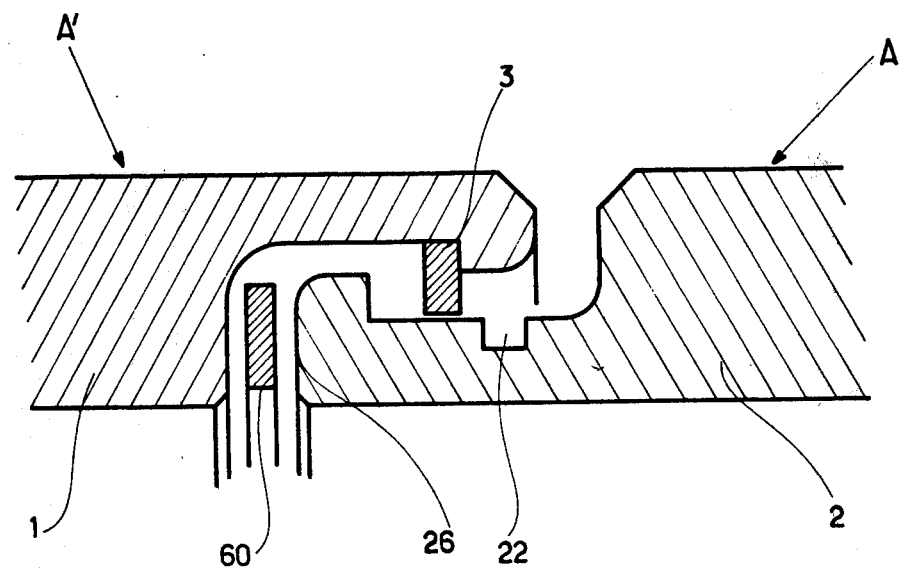
Figure: 3

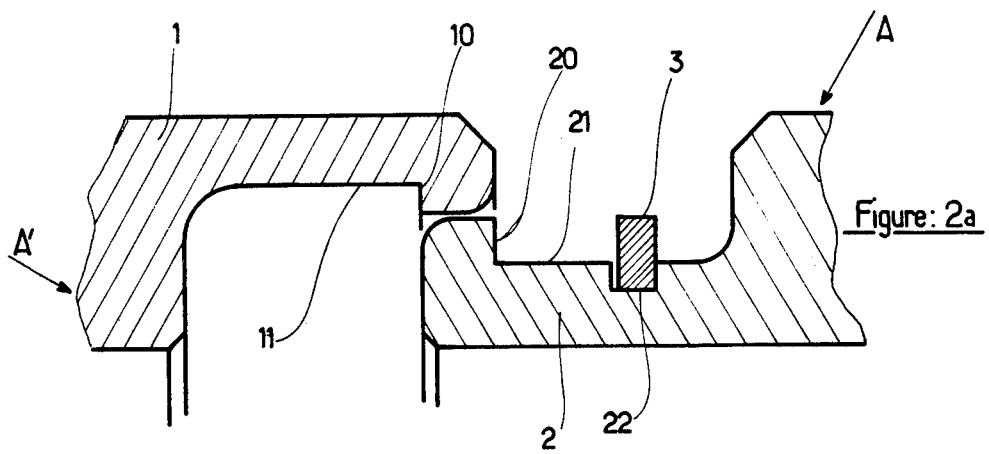
Figure: 2a
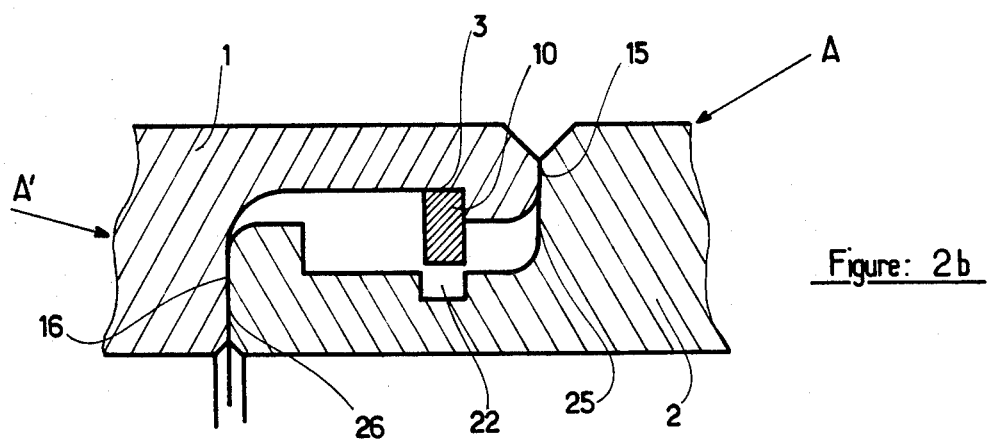
Figure: 2b
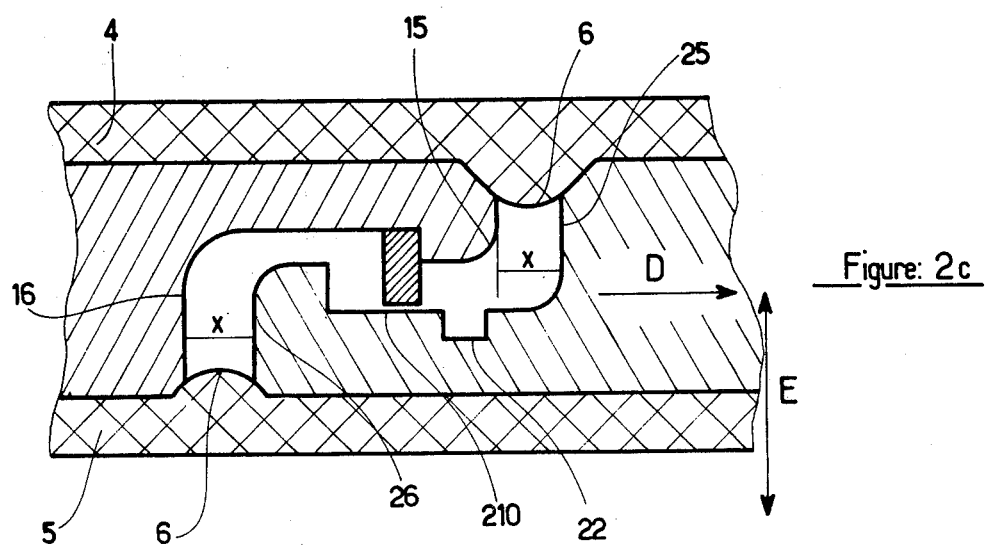
Figure: 2c

FLEXIBLE TUBE PARTICULARLY FOR DRILLINGS, AND A PROCESS FOR MANUFACTURING SAID TUBE

The present invention provides a flexible tube, particularly a drilling tube, as well as a process for manufacturing said tube.

Various types of flexible pipes or tubes carrying a metallic framework are already known.

A known type of flexible pipe consists of a metallic framework helically wound, the corresponding edges of two turns being imbricated into one another through shaping.

Such pipes are used in industry only for some domestic purposes such as for example flexible pipes for shower apparatus.

However, despite attempts made to improve said pipes, they are not suitably resistant to radial pressures or to crushing pressures. As a matter of fact, the turns of said pipes tend to open or to become flat.

Also, flexible pipes consisting of rings each carrying an edge in the form of a male piece and an edge in the form of a female piece are already known, so as to allow said rings to imbricate each other and to ensure the clamping thereof. However, so as to make it possible to connect two rings to one another through resilient deformation of the male and female pieces, said pieces must be relatively flexible. Inversely, if it is sought to achieve pieces resistant to great radial constraints, the male and female pieces do not show the sufficient flexibility to make it possible to easily imbricate the rings into one another.

Now, the recent development of the drilling techniques and in particular those relating to drilling at sea, consist in using a tube, not rigid but flexible, the lower end of which carries a drilling head or trepan, which carries one or more hydraulic motors, said tube serving to clear out the rocks and the sand picked up by the drilling head.

The main interest of said technique lies in that it makes it possible to use a pipe of a practically unlimited length, or again a pipe which can be wound or arranged loop-shaped on the ground without being necessary to dismount it as required with the former techniques consisting in using rigid tubes connected together or dismounted about the drilling platform.

The tests achieved within the framework of this new technique by means of flexible pipes consisting of helically wound turns did not provide the results expected, particularly in view of the weak radial resistance of said pipes. Where it was attempted to increase their radial resistance by increasing the thickness of the stripe helically wound around said pipes, the diameter of same has necessarily been increased too. Furthermore, said pipes are relatively rigid, which is an additional drawback.

The present invention is aimed to remedy these drawbacks and to this end provides a flexible pipe resistant to strong radial pressures as well as to great pull and which can be very quickly and easily manufactured and fitted together although said pipe enjoys a sufficient flexibility so as to be wound around drums of reasonable sizes.

To this end, the invention provides a flexible pipe wherein each of the rings of said pipe carries a male portion and a female portion, the male portion of a ring being designed to imbricate into the female portion of the contiguous ring, the male and female portions each carrying an abutment, a locking means being fitted between the male portion and the female portion of both contiguous rings by co-operating with abutments of the male and female portions so as to prevent both said rings from parting from one another although providing an axial clearance to said rings.

According to a characteristic feature of the invention, the locking means is a segment or split ring and the abutments of the male and female portions are shoulders being an integral part of said male and female portions of the rings.

In order to facilitate the mounting or reduce any accidental risk of dismounting it is interesting that the male and/or female portions carry a groove designed to receive at least partly the locking means when the mounting of the male portion and of the female portion of two contiguous rings is performed.

More particularly, said groove is achieved in the male portion in such a way that where both male and female portions are totally fitted in each other said groove is registering with the abutment of the female portion.

Finally, according to a further characteristic feature of the invention, said flexible pipe carries a spacing piece arranged between two contiguous rings so as to limit the axial clearance of the male portion of a ring in relation to the female portion and the other ring, the length of said spacing piece being at least equal to a fraction of the width of said groove.

Said spacing piece may be either a ring fitted in the male portion or introduced into the female portion, or also consist of a pad being a part of the external or internal sheaths provided about the rings connected together and thus constituting the pipe.

Also, the invention relates to a process for manufacturing tubes such as those disclosed hereabove. According to said process the segment is positioned into the groove of the male portion of a ring and kept in said position, then the male portion thus carrying said segment is slided inside the female portion of another ring until said segment is fixed against the shoulder of the female portion, then the male portion is pushed backwards so as to leave a space between said two rings and that the segment is not located above the groove of the male portion. Afterwards, a coating made of a flexible material, for example elastomere, is molded about the tubes, inside and outside said tubes too. In order to limit the displacement of two contiguous rings in relation to each other, open discs may be positioned between said rings. Also, the displacement of the rings in relation to each other may be limited by pads of the coating.

Thanks to the present invention, a flexible pipe can be achieved, said pipe being resistant to strong radial pressures; the mounting and manufacturing of said pipe are particularly simple which is all the more important as it is sought to assemble a great number of rings.

By way of example, pipes designed to drilling comprise between 30 to 50 rings per meter. Accordingly, assembling becomes an important element of the cost price of pipes so that any simplification brought to said assembling has a considerable repercussion on said costing price.

Finally, the pipe provided by the invention is sufficiently flexible, that is to say that two contiguous rings can axially slide in relation to one another and unequally so as to make the pipe sufficiently flexible to be wound around drums of a reasonable size having diameters ranging from 2.50 to 3 meters. Said flexibility is also of importance for using said pipe. As a matter of fact, if said pipe is used for drilling, it may be required to change the direction during said drilling. This is quite possible in view of the fact that the driving and guiding may be performed at the level of the drilling head. Up to now, this was not possible to achieve with rigid tubes. Thanks to the flexible pipe provided by the invention this is now quite possible without so far the curve zone of said flexible pipe, said curve zone traveling in relation to the pipe as and when said pipe moves forwards, constituting a zone less resistant. Now, this is particularly of importance in view of the tremendous pressures met at the very great depths of drillings.

Also, the flexibility of said pipe is interesting when it is raised after drilling is performed. As a matter of fact, it suffices to pull up said pipe and to lay it down on the ground without being necessary to wind it on drums.

Finally, said flexible pipe can be used not only for drillings but also as a device for the protection of submarine, underground, etc. ... cables.

The flexible pipe the subject matter of the present invention will be depicted with more details by means of the attached drawings, wherein:

FIG. 1 shows a pipe consisting of rings having a certain flexibility.

FIGS. 2a to 2c are part longitudinal cross-section views of the male and female portions of two contiguous rings in three different positions.

FIG. 3 is a variant of the tube shown in FIGS. 2a to 2c.

As shown in FIG. 1, the tube, the subject matter of the present invention, is constituted by fitting various rings A in one another.

The fitting of said rings A in one another is performed in such a way that the whole tube shows a certain flexibility making it possible for two close rings A and A' to form an angle α with each other.

As shown in FIG. 2a, each ring A carries a male portion 2 and a female portion 1. Said male portion 2 of a ring A is designed to fit into the female portion 1 of the contiguous ring A'.

Both male 2 and female 1 portions carry resting surfaces constituting abutments 10 and 20 designed to limit the radial motion of the rings A and A' in relation to each other.

As shown in FIGS. 2a to 2c, said abutments 10 and 20 consist of shoulders. Said shoulders make peripheral grooves 11 and 21 in the male and female portions 1 and 2 of the rings A and A'.

A locking element 3 is fitted between the male portion 2 of the ring A and the female portion 1 of the ring A', so as to co-operate with the shoulders 10 and 20 in order to prevent both said rings A and A' from parting from each other, although providing an axial clearance between said rings A and A'.

Said locking element 3 consists of a segment, that is to say a split ring.

The male end 2 of the ring A carries a groove 22 designed to receive at least partly said segment 3 while the male and female portions 2 and 1 of two contiguous rings A and A' are assembled together.

Said groove 22 is made in the portion 2 of the piece A in such a way that where both portions 1 and 2 are fully fitted together said groove 22 is then located on a level with (aligned with) the abutment 10 of the female portion 1 of the ring A'.

As shown in FIG. 2c, an internal sheath 5 and an external sheath 4 cover the tube constituted through the fitting of rings such as A and A' in one another.

A spacing piece 6 arranged between two contiguous rings A and A' limits the axial clearance of the male portion 2 of a ring in relation to the female portion of the contiguous ring. The purpose of said spacing piece 6 is to prevent, when in fitting position, the segment 3 from engaging the groove 22 of the male portion 2 of a ring A.

As shown in FIG. 2c, said spacing piece consists of a pad of the external and internal sheaths 4 of the tube.

As shown in FIG. 3, said spacing piece consists of a ring 60 and 61.

As shown in FIGS. 2a to 2c, the fitting of the male and female portions 2 and 1 of the rings A and A' is performed as follows:

Firstly, the segment 3 is engaged into the groove 22 of the male portion 2 of the ring A. Afterwards, the portion 2 is kept sliding inside the portion 1 by keeping said segment 3 into the groove 22, and this is performed until the segment 3 comes in abutment against the shoulder 10 of the female portion 1 of the ring A' such as shown in FIG. 2c.

At that time, said segment 3 which rests, on the one hand on the shoulder 10 and, on the other on the bottom of the circular groove 11 of the female portion 1 of the ring A' is just located above the groove 22 of the portion 2 of the ring A.

The size of the rings A and A' is such that, when thus positioned, the ends 15 and 25 on the one hand, and 16 and 26 of the other are exactly in contact with each other where the segment 3 rests against the shoulder 10 above the groove 22.

At that time, both rings A and A' can be disconnected as the segment 3 can retake its former position inside the groove 22.

To lock both rings A and A' together, the ring A is removed as shown by arrow D so that the segment 3 is positioned above the portion 210 of the circular groove 21 located between the groove 22 and the abutment 20. At that time, the portions 15 and 25, 16 and 26 of the rings A and A' are spaced by X from each other which makes it possible to obtain a tube showing a certain flexibility in the direction shown by a double arrow E.

As shown in FIG. 2c, where the male portions 2 and female portions 1 of two contiguous rings A and A' are positioned in their final location, internal and external coatings 4 and 5 are cast around the tube thus formed, said coatings consisting of a flexible material such as for example elastomers around rings A and A'.

When molding is performed, said coating 4, 5 becomes encrusted in the rings A and A' to form pads 6 which show a certain flexibility thus making it possible for the rings A and A' to move according to an angle, but definitely restricting the bringing together of the portions 15, 25 or 16, 26 which results in that the segment 3 can in no way come back opposite the groove 22 and a fortiori engage said groove 22, hence the impossibility of disconnection between two contiguous rings.

As shown in FIG. 3, open discs 60 or 61 made of any material whatever (steel, plastic or elastomere) and which are positioned after the segment 3 has engaged, can advantageously replace the pads shown in FIG. 2c to limit the bringing together of the portions 15, 25 and 16, 26 of two rings A and A'.

Of course, the invention is not limited to the mode of embodiment disclosed and depicted hereabove, from which other variants can be provided without thereby departing from the scope of the invention.

What we claim is:

1. A flexible tube consisting of rings assembled side-by-side, each ring comprising a male and a female portion, said male portion of a ring having a diameter at one end freely interfitting in the female portion of a contiguous ring, the male and female portions each carrying an abutment, a separate split locking segment being loosely fitted between the abutments of the male and female portions of two contiguous rings, one of said portions being provided with a groove designed to receive at least partly the split segment so as to enable the male and female portions of two contiguous rings to be assembled together, said groove registering with an abutment when said male and female portions are fitted in each other, at least one spacing piece being arranged between the two contiguous rings so as to limit the axial clearance of the male portion of a ring in relation to the female portion of the ring, thereby providing a first position of said locking segment which allows interfitting of said portions, and a second position of said locking segment wherein said segment co-operates with said abutments of said male and female portions to prevent both said rings from parting axially from one another although leaving an axial clearance between said rings.

2. A flexible tube according to claim 1 wherein the tube is provided with an internal sheath and an external sheath both made of flexible material.

3. A flexible tube according to claim 1 wherein the spacing piece consists of a ring.

4. A flexible tube according to claim 1 wherein the spacing piece consists of a pad of an internal and/or external sheath covering said tube.

5. A process for assembling a flexible tube consisting of rings assembled side-by-side each ring comprising a male and a female portion, said male portion of a ring having a diameter at one end freely interfitting in the female portion of a contiguous ring, the male and female portions each carrying an abutment, a separate locking element being loosely fitted between the male and female portions of two contiguous rings and so mounted on the inside of one of said portions as to have one position which allows interfitting and a second position co-operating with said abutments of said male and female portions so as to prevent both said rings from parting axially from one another although leaving an axial clearance between said rings, wherein the locking element is positioned in a groove of the male portion of a ring, then said male portion which carries said locking element is pushed inside the female portion of another ring till said element comes in contact with the abutment of said female portion, then said male portion is partly pulled out from said female portion, so as to provide an axial space between the two rings while displacing said locking element axially with respect to the groove of said male portion.

* * * * *